H. STUMP.
Bee Hive.

No. 45,358. Patented Dec. 6, 1864.

Witnesses:
Jno. J. McNamara
L. P. Hall

Inventor:
Henry Stump

UNITED STATES PATENT OFFICE.

HENRY STUMP, OF ADEL, IOWA.

IMPROVEMENT IN BEE-HIVES.

Specification forming part of Letters Patent No. 45,358, dated December 6, 1864.

*To all whom it may concern:*

Be it known that I, HENRY STUMP, of Adel, in the county of Dallas and State of Iowa, have invented a new and Improved Bee-Hive; and I do hereby declare that the following is a full, clear, and exact description thereof, which will enable others skilled in the art to make and use the same, reference being had to the accompanying drawings, making a part of this specification, in which—

Figure 2:
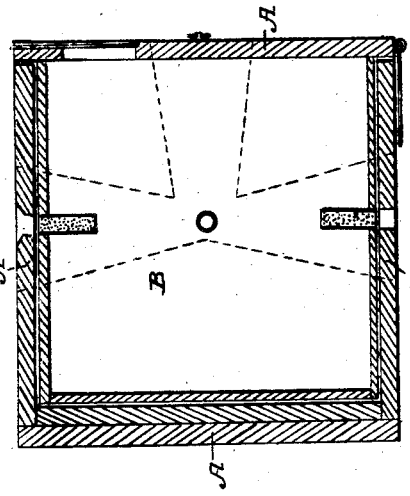
Figure 3:
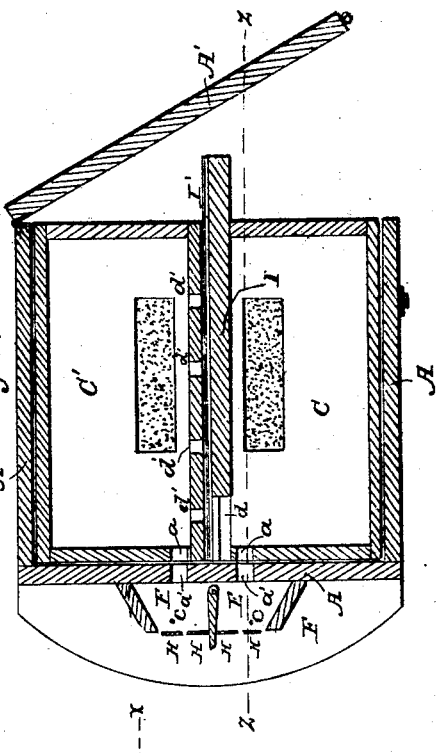
Figure 1:
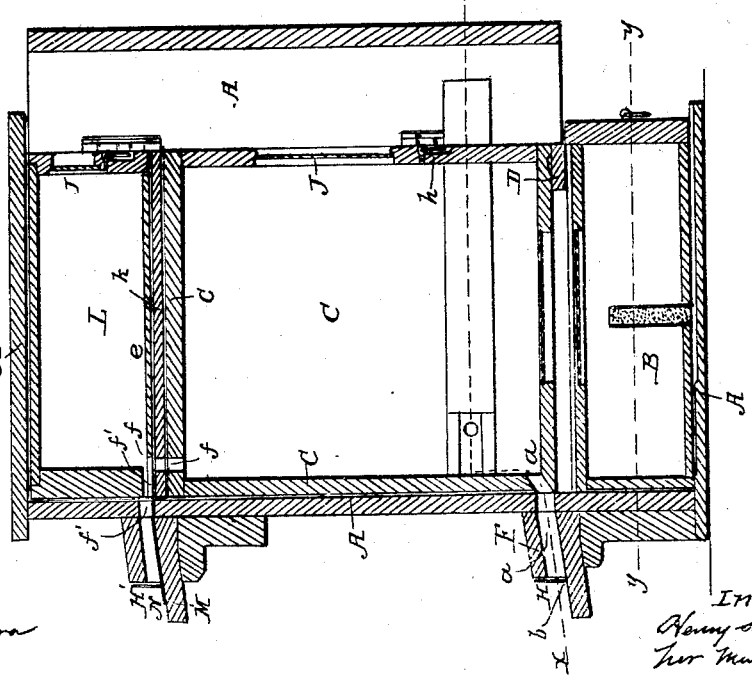

Figure 1 is a side sectional elevation of my improvement. Figs. 2 and 3 are horizontal sectional views of the same.

Similar letters of reference indicate like parts.

This hive is intended to be made in square or box form, of which A indicates the sides, top, and bottom, and A' the hinged back thereof.

The base of the hive is provided with a moth or miller drawer or trap, B, which will be readily understood without special description.

C C' are the comb or brooding boxes, or, as I term them, the "homesteads." These boxes stand side by side within the hive A, resting upon the bottom ledges thereof, D, above the moth trap, as shown.

At the front lower corner of each of the boxes C there is an orifice, $a$, for the entrance of the bees, which communicates with the orifice $a'$ through the hive A, upon the outside of which is placed the alighting-board E. The orifices $a$ are covered by a weather-hood, F, which is divided centrally by a pivoted guide board or flap, G; but this flap I do not claim as my invention.

Upon the front edge of the hood F, I arrange a series of hinged entrance-guards, H, so arranged that they may all, or either of them, be thrown up, and leave the entrances to the hive unobstructed; or the said guards may be turned down so as to contract the entrances. The lower edges of the guards H are provided with notches $b$, so that when turned down only the working-bees can gain access to the hives, while the drone bees will be excluded. C C are stops to regulate the lateral swing of the flap G.

Upon the adjoining sides of each of the boxes C there is a slide, I I', which when removed uncovers a slot, $d$, in one box, and a series of communicating apertures, $d'$, in the other, so that the bees may pass from one box to the other, or the said communication may be cut off at will. It will be observed that I arrange these slides in the lower part of the boxes, the object being to prevent the bees from sealing up the edges of the slides, and thus prevent their operations. If the said openings and slides were placed higher up, the bees would soon seal said slides with wax; but by arranging the slides and openings in the lower part of the boxes this difficulty is overcome, because the bees will not seal the apertures when they are so low down, and thus a free communication between the homesteads or boxes C C is always maintained.

J are glasses set in the backs of the boxes to facilitate the inspection thereof. The bottoms of the boxes are made removable at pleasure.

The boxes C C' may be separately drawn out from the hive by means of the ring $h$, the communicating slides I I having first been closed.

The spare honey-boxes are arranged upon the upper floor, K, above the tops of the boxes C C. L L are the said spare honey-boxes, which fill the space above the boxes C C, and the top of the hive, as shown. The bottoms of the boxes L L consist of loose plates, as shown at $e$. At the front part of the bottoms $e$ $e$ there is a vertical aperture, $f$, leading down through the floor K K and the top of the boxes C C', as shown, so that there is a communication between each box C, and the spare honey-box L above it, through which the bees pass, but there is no direct communication between the boxes L L. The front end of each honey-box also has an aperture, $f'$, extending through the front of the hive and terminating upon an alighting-board, M, which is hooded, and the hood is provided with a movable flap and hinged guards H', similar to the corresponding parts before described in connection with the lower alighting-board.

N N are adjustable slides passing from the alighting-board M, through the apertures $f'$, and intended to cover at will the vertical apertures $f$, so that when desired the entrance of the bees into the honey-boxes from the boxes C C' may be easily prevented.

I do not claim the moth-box nor the movable flaps; but

Having thus described my invention, I claim—

The arrangement and construction of the entrance and connecting passages in the double hive, as described, consisting of the guarded entrances, the connecting-passage consisting of a slot and a series of holes in the adjacent sides, respectively, and closed by a slide, together with the auxiliary entrances $f'$ and the passages $f$ from the brood-chambers to the honey-boxes, the whole forming a means of communication from the outside, and from one part to another, to be used as circumstances require, substantially as described and represented.

HENRY STUMP.

Witnesses:
JOHN WARFORD,
COLE NOEL.